(12) United States Patent
Griffin

(10) Patent No.: US 8,838,346 B1
(45) Date of Patent: Sep. 16, 2014

(54) SEEDER

(76) Inventor: Donald J. Griffin, Indianapolis, IN (US)

( * ) Notice: Subject to any disclaimer, the term of this patent is extended or adjusted under 35 U.S.C. 154(b) by 75 days.

(21) Appl. No.: 13/230,166

(22) Filed: Sep. 12, 2011

Related U.S. Application Data

(60) Provisional application No. 61/381,951, filed on Sep. 11, 2010.

(51) Int. Cl.
*A01B 61/04* (2006.01)
*A01B 63/32* (2006.01)
*A01C 5/00* (2006.01)

(52) U.S. Cl.
USPC ............ 701/50; 111/164; 111/166; 111/167; 111/170; 111/189; 111/194; 111/200

(58) Field of Classification Search
USPC ............... 701/50; 111/200, 14, 149, 157, 111/163–170, 174, 189–195, 925
See application file for complete search history.

(56) References Cited

U.S. PATENT DOCUMENTS

| | | |
|---|---|---|
| 4,145,980 A | 3/1979 | Boots |
| 4,285,284 A | 8/1981 | van der Lely |
| 4,422,511 A * | 12/1983 | Poggemiller et al. ...... 172/260.5 |
| 4,721,048 A | 1/1988 | Fuss et al. |
| 5,351,635 A | 10/1994 | Hulicsko |
| 5,413,055 A | 5/1995 | Dern |
| 7,412,933 B2 | 8/2008 | Bourgault et al. |
| 7,870,826 B2 | 1/2011 | Bourgault et al. |

* cited by examiner

*Primary Examiner* — Christopher J Novosad
(74) *Attorney, Agent, or Firm* — Kenneth L Tolar

(57) ABSTRACT

A seeder for attaching to a tractor or another towing vehicle includes a carriage mounted on a plurality of wheels that allow the device to easily traverse roads and other terrain. Atop the carriage are a pair of bins, each for storing a discrete type of seed for dispersing into furrows. Beneath the bins are a plurality of juxtaposed seeding units for simultaneously sowing multiple, closely-spaced rows of seeds. Each seeding unit includes a furrowing assembly formed of a shaft having a plurality of cogged cutting wheels mounted thereon. Immediately trailing each cutting wheel is a spring-biased compaction wheel that compresses and covers each furrow as it is sown. Each shaft also includes a designated height-adjustment mechanism that compensates for undulating or varying terrain. Accordingly, as the carriage traverses a field, the cutting wheels create multiple, minimally-spaced furrows into which seeds are automatically dispensed; the height-adjustment mechanism automatically raises or lowers the cutting blades as underlying terrain varies to assure that all seeds are planted at a consistent depth.

8 Claims, 4 Drawing Sheets

SEEDER

CROSS REFERENCE TO RELATED APPLICATIONS

This application is entitled to the benefit of provisional application No. 61/381,951 filed on Sep. 11, 2010.

BACKGROUND OF THE INVENTION

The present invention relates to a seeder that more densely populates a given field with grass or hay seeds.

DESCRIPTION OF THE PRIOR ART

Conventional seeders are primarily designed to sow crops and, therefore, only deposit seeds in widely-spaced rows. When using a conventional seeder to plant grass or hay, a worker must repeatedly travel back-and-forth to achieve a desired seed density, which is costly and laborious. Furthermore, because conventional seeders are designed to plant seeds at a given depth, terrain variations cause inconsistent seed depths and plant yields. Accordingly, there is currently a need for device that overcomes the above-described disadvantages associated with conventional seeders.

A review of the prior art reveals a myriad of seeders that are purportedly designed to address various problems associated with conventional seeders. For example, U.S. Pat. No. 7,412,933 issued to Bougault et al. discloses a seeder including a rolling frame having a furrow opener and a packing wheel.

U.S. Pat. No. 5,413,055 issued to Dern discloses an all-terrain seeder including a trailer having a seed hopper and soil-packing wheels mounted thereon.

U.S. Pat. No. 5,351,635 issued to Hullicsko discloses a seeder including a rolling frame having furrow cutters that are raised and lowered by a mechanical linkage according to underlying terrain.

U.S. Pat. No. 4,721,048 to Fuss et al. discloses a seeder having a furrowing wheel that is raisable to traverse obstructions.

U.S. Pat. No. 4,285,284 issued to van der Lely discloses a seeder with pivotal soil breakers.

U.S. Pat. No. 4,145,980 issued to Boots discloses a device for planting seeds at precise intervals including a movable frame mounted on a main frame. The movable frame includes seed drums, furrowing discs and watering manifolds. An automated sensing mechanism actuates hydraulic cylinders to adjust the height of each side of the moving carriage according to underlying terrain variations.

U.S. Pat. No. 7,870,826 to Bourgault et al. discloses a seeder having a sensor, such as a strain gauge, that detects variation in soil firmness to vary the biasing force applied to a packing wheel.

As indicated above, numerous seeders with adjustable soil cutters or packing wheels exist in the prior art. Furthermore, the patent issued to Boots discloses a seeder having an automated adjustment mechanism for lifting and lowering either side of a wide seeder frame according to underlying terrain. However, none of the prior art references include a plurality of independently-adjustable cutting wheels for more efficiently seeding fields and other larger areas. Furthermore, the prior art also fails to disclose a means for easily varying a seeding dispersal rate.

The present invention overcomes the disadvantages of the prior art by providing a seeder having a plurality of cutting wheels that are automatically and independently adjusted as underlying terrain varies to maintain a consistent seed depth. Furthermore, the present invention includes an automated controller that adjusts a dispensing flap to disperse seeds at a desired speed.

SUMMARY OF THE INVENTION

The present invention relates to a seeder for attaching to a tractor or another towing vehicle comprising a carriage mounted on a plurality of wheels that allow the device to easily traverse roads and other terrain. Atop the carriage are a pair of bins, each for storing a discrete type of seed for dispersing into furrows. Beneath the bins are a plurality of juxtaposed seeding units for simultaneously sowing multiple, closely-spaced rows of seeds. Each seeding unit includes a furrowing assembly formed of a shaft having a plurality of cogged cutting wheels mounted thereon. Immediately trailing each cutting wheel is a spring-biased compaction wheel that compresses and covers each furrow as it is sown. Each shaft also includes a designated height-adjustment mechanism that compensates for undulating or varying terrain. Accordingly, as the carriage traverses a field, the cutting wheels create multiple, minimally-spaced furrows into which seeds are automatically dispensed; the height-adjustment mechanism automatically raises or lowers the cutting blades as underlying terrain varies to assure that all seeds are planted at a consistent depth.

It is therefore an object of the present invention to provide a seeder that more densely plants seeds than conventional seeders.

It is another object of the present invention to provide a seeder that automatically compensates for terrain variations to create consistent furrow depths.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
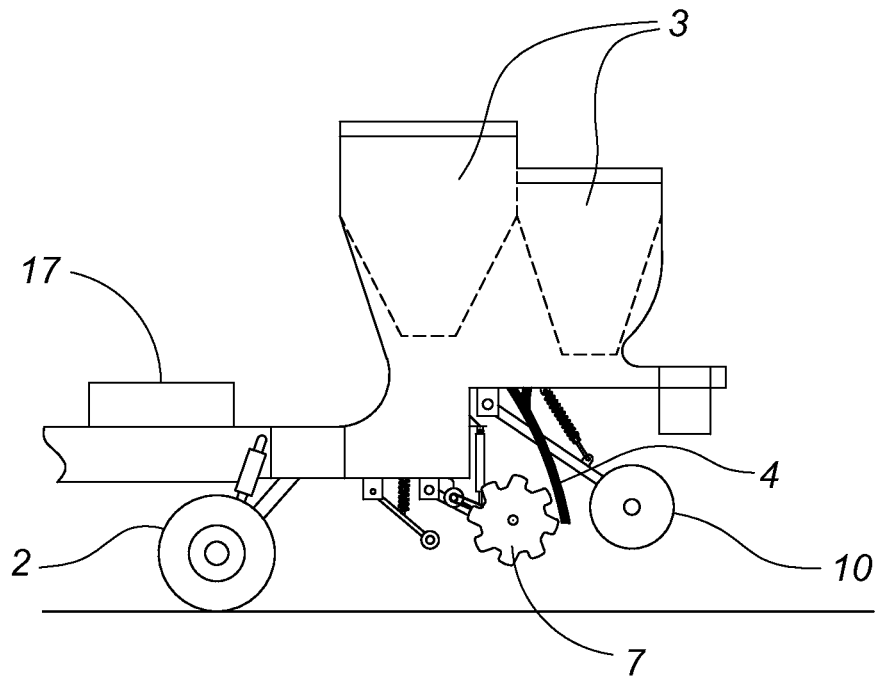
FIG. 1 is a side view of the seeder according to the present invention with the depicted cutting and compaction wheels in a retracted position.
Figure 2:
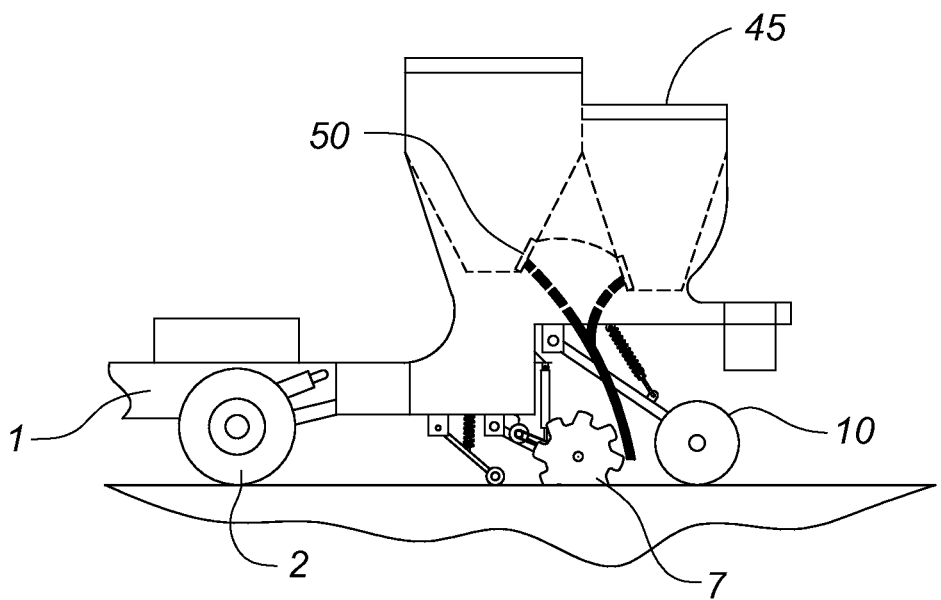
FIG. 2 is a side view of the seeder with the cutting and compaction wheels deployed.
Figure 3:
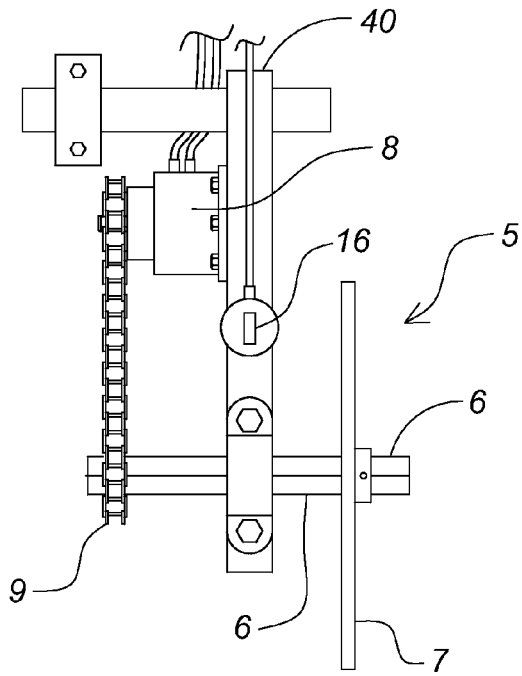
FIG. 3 is a bottom view of a pair of exemplary seeding units.
Figure 5:
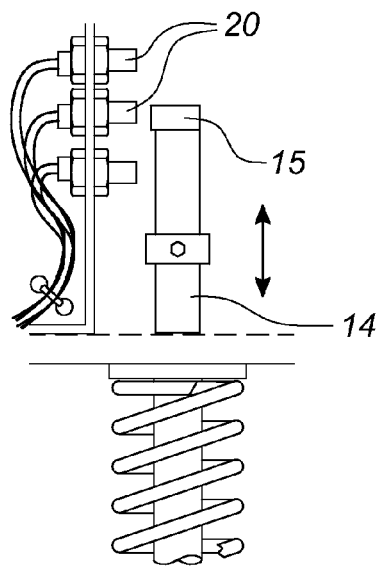
FIG. 5 is an isolated view of the Hall-effect sensor.
Figure 4:
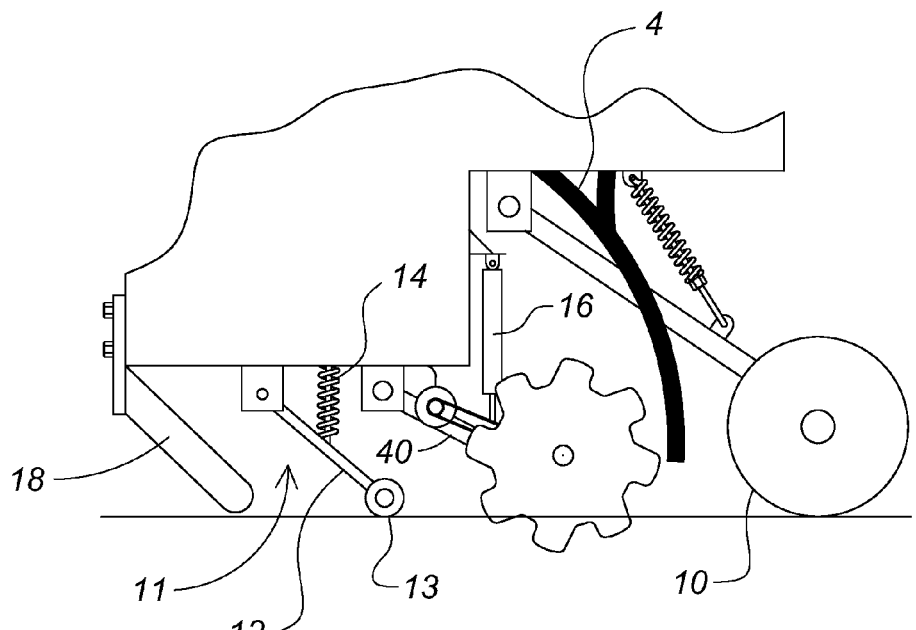
FIG. 4 is an isolated, side view of an exemplary seeding unit.
Figure 6:
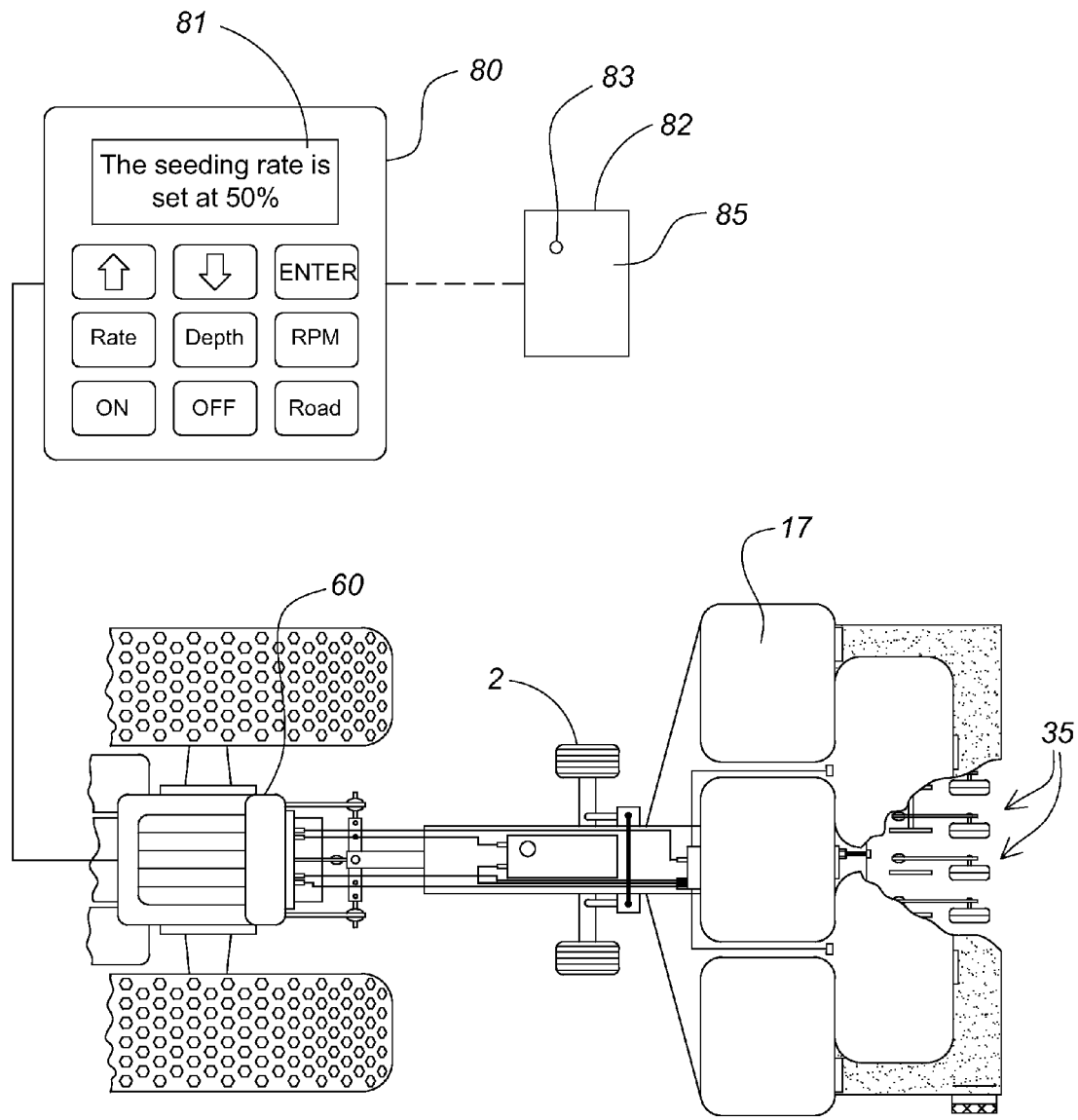
FIG. 6 is a top view of an exemplary towing vehicle with the seeder attached thereto.
Figure 7:
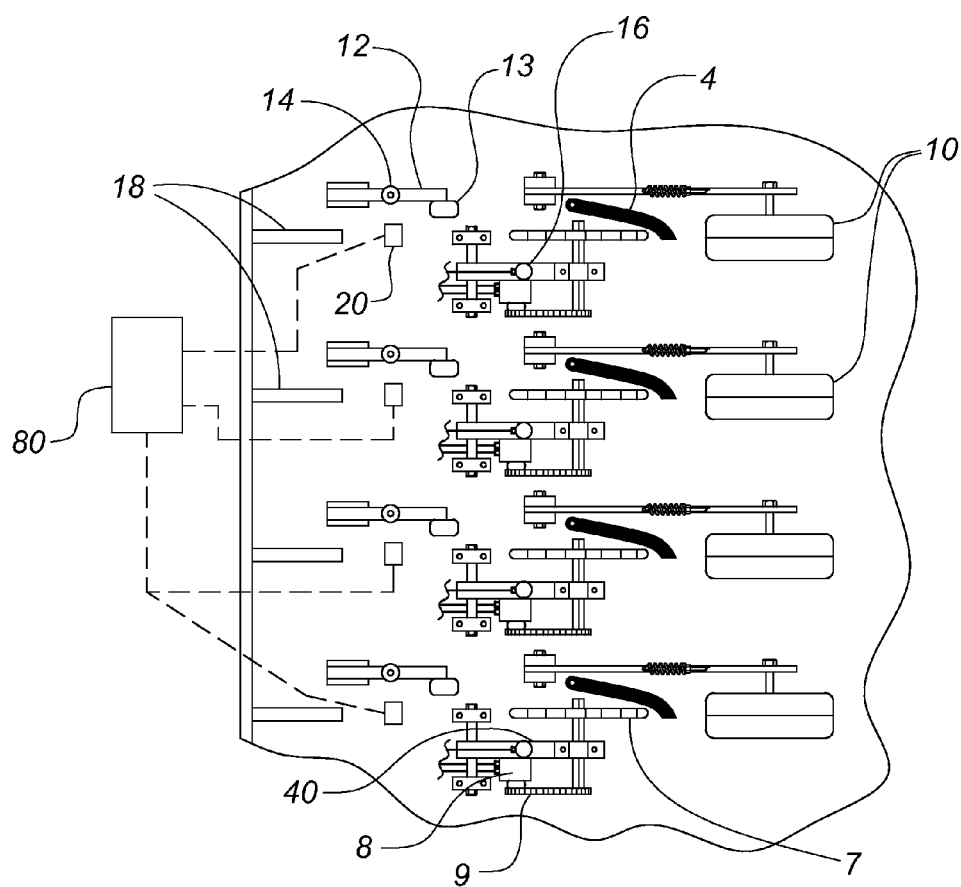
FIG. 7 is an isolated, top view of the seeding units and associated height-adjustment mechanisms.
Figure 8:
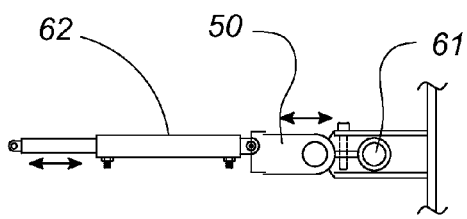
FIG. 8 is an isolated view of an exemplary dispensing opening and an associated sliding flap for selectively dispensing seed onto underlying terrain.
Figure 9:
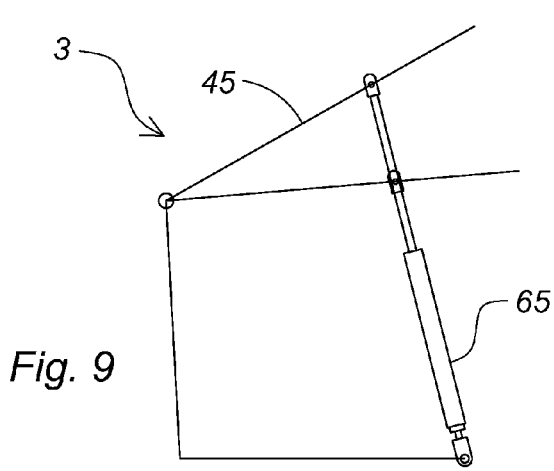
FIG. 9 is an isolated, cross-sectional view of an exemplary bin and lift cylinder.

The present invention relates to a seeder for attaching to a tractor 60 or a similar towing vehicle comprising a wide-profile carriage 1 mounted on a plurality of wheels 2 that allow the device to easily traverse roads and other terrain. Atop the carriage are a pair of wide-profile bins 3, each for storing a discrete type of seed, such as hay or grass. Each bin includes a pivotal lid 45 that is maintained in an open position with pneumatic or hydraulic cylinders 65 to facilitate refilling.

The bins further include one or more dispensing openings 61 at a lower end that are selectively closed by a sliding flap 50. The flap is moved between an open and closed position with a spring-biased, hydraulic cylinder 62 that is adjusted by a controlling computer according to a preselected feed rate. Each opening is positioned immediately above a plurality of feed tubes 4 that extend downwardly toward underlying terrain. The tubes are bundled into groups which are each positioned to align with furrowing discs on a designated seeding unit described, infra.

Multiple, juxtaposed seeding units 35 are positioned beneath the bins for simultaneously planting multiple rows of seeds in a single pass. Each seeding unit includes a furrowing assembly 5 formed of a shaft 6 having a plurality of cogged cutting wheels 7 mounted thereon. The cutting wheels are spaced at select, minimal distances to create higher seed and row densities. Immediately trailing each cutting wheel is a spring-biased compaction wheel 10 that compresses and covers each furrow as it is sown.

Each shaft also includes a designated height-adjustment mechanism 11 that compensates for undulating or varying terrain. A pivotal arm 12 has a roller 13 at a distal end that engages the ground during normal operation. A spring-biased rod 14 connected to the arm 12 has a magnet 15 at an upper end that aligns with a select one of a plurality of Hall-effect sensors 20 to notify the controller of underlying terrain variations. A hydraulic cylinder 16 raises or lowers each shaft according to the measured distance between the ground and carriage to compensate for terrain variations.

Each shaft is selectively rotatable in a direction opposite that of the direction of travel using a designated hydraulic motor 8 and drive chain 9. The motor 8 is preferably mounted on a pivotal brace 40 interconnecting the shaft and carriage so that it moves with its designated cutting wheels.

On a front end of the carriage is a reservoir 17 for storing additional hydraulic fluid necessary to operate the hydraulic cylinders in the event that the fluid source from the towing vehicle is overwhelmed. A debris deflector 18 is positioned in front of the height-adjustment mechanism for protecting the cutter blades from potentially-damaging items, such as rocks or metal.

Accordingly, a user attaches the carriage to a tractor and connects all hydraulic and electrical accessories necessary to operate the various components. Using an interactive screen 81 associated with the controlling computer 80, the user selects a desired seeding program, boards the tractor and actuates the program with a START 83 button on a wireless remote unit 82. The cutter blades are then lowered to an initial, preprogrammed position. A SEED 85 button on the remote is then depressed at which time the computer opens the dispensing flaps according to the selected feed rate. As the carriage traverses a field, the height-adjustment mechanism automatically raises or lowers the cutting blades as underlying terrain varies to sow seeds at a consistent depth.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A seeder comprising:
   a rolling carriage for attaching to a towing vehicle;
   at least one bin mounted on said rolling carriage for storing seeds;
   means for dispersing a select amount of seeds from said at least one bin to underlying terrain;
   a plurality of shafts mounted on a pivotal brace connected to said rolling carriage, each of said shafts having a plurality of cogged cutting wheels mounted thereon;
   a compaction wheel trailing each of said cogged cutting wheels;
   means for raising and lowering each of said shafts according to variations in underlying terrain.

2. The seeder according to claim 1 wherein said means for dispersing a select amount of seeds from said at least one bin to underlying terrain comprises:
   a dispensing opening on said at least one bin;
   a slidable flap selectively closing said dispensing opening;
   a first telescoping cylinder attached to said slidable flap;
   a controller for extending and retracting said cylinder in response to a predetermined command to move said slidable flap to a select position to achieve a desired feed rate.

3. The seeder according to claim 2 wherein said means for raising and lowering each of said shafts according to variations in underlying terrain comprises:
   a pivotal arm attached to said carriage having a roller at a distal end for engaging the ground;
   a spring-biased rod connected to said arm;
   a magnet on said rod;
   a plurality of Hall-effect sensors adjacent to said rod for detecting a relative height of said magnet, said sensors in communication with said controller;
   a second telescoping cylinder attached to each of said shafts that raises and lowers said shaft according to the relative height of said magnet to compensate for terrain variations.

4. The seeder according to claim 3 wherein said first telescoping cylinder and said second telescoping cylinder are hydraulically powered.

5. The seeder according to claim 4 further comprising a reservoir on said carriage for storing additional hydraulic fluid in the event that a hydraulic system on the towing vehicle is overwhelmed.

6. The seeder according to claim 2 further comprising means for instructing said controller to disperse seeds at a select rate.

7. The seeder according to claim 1 further comprising a debris deflector positioned in advance of each of said cogged cutting wheels for deflecting obstructions.

8. A seeder comprising:
   a rolling carriage for attaching to a towing vehicle;
   at least one bin mounted on said rolling carriage for storing seeds;
   means for dispersing a select amount of seeds from said bin to underlying terrain;
   a plurality of juxtaposed seeding units mounted on said rolling carriage, each of said seeding units including a shaft having a plurality of cogged cutting wheels mounted thereon and a compaction wheel trailing each of said cogged cutting wheels;

means for independently raising and lowering a shaft of one of said seeding units relative to a shaft of another of said seeding units according to variations in underlying terrain.

\* \* \* \* \*